Jan. 8, 1935.  D. E. ROSS  1,986,980
METAL BUILDING CONSTRUCTION
Filed June 12, 1933  2 Sheets-Sheet 1
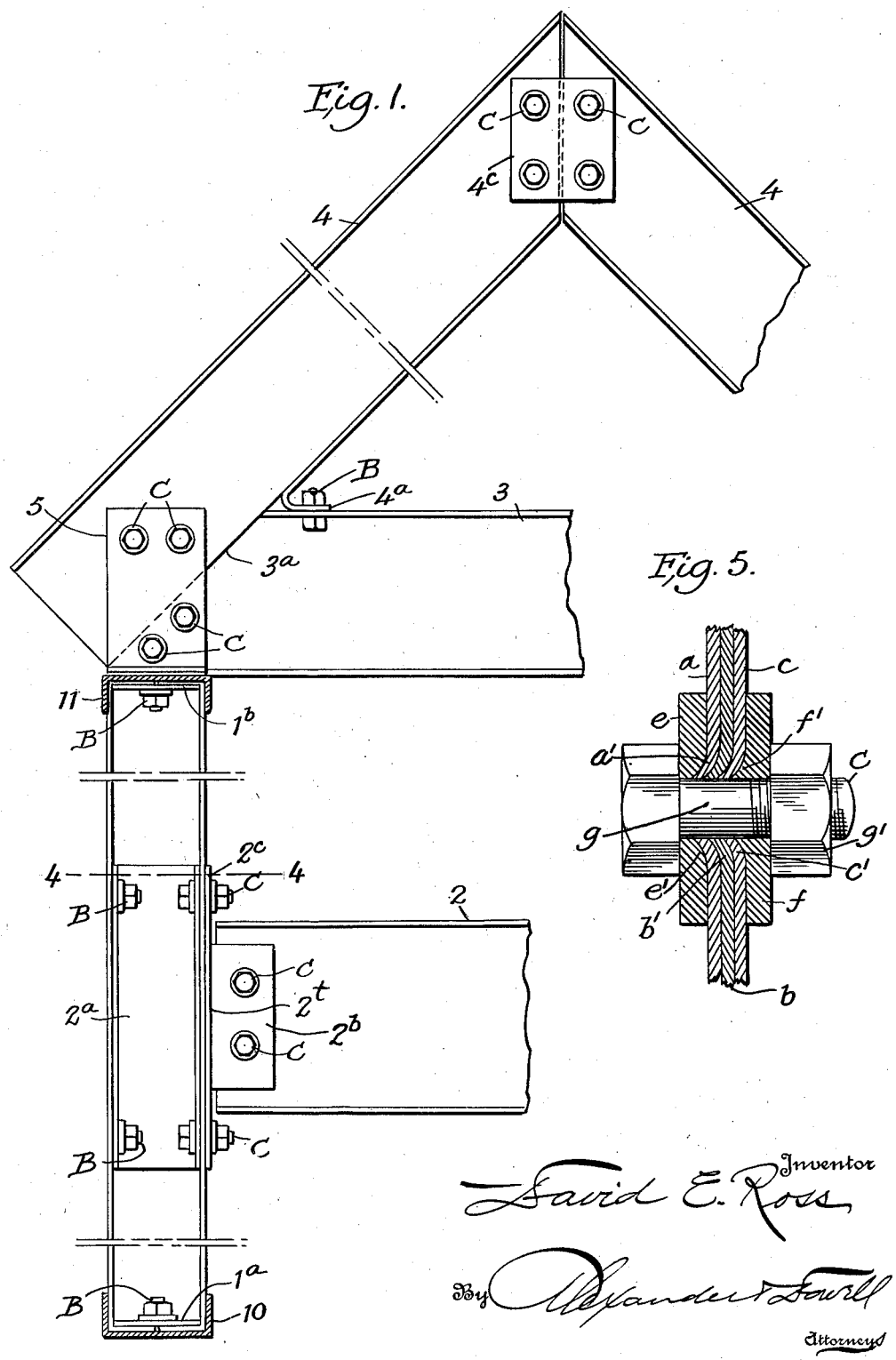

Jan. 8, 1935.  D. E. ROSS  1,986,980
METAL BUILDING CONSTRUCTION
Filed June 12, 1933   2 Sheets-Sheet 2
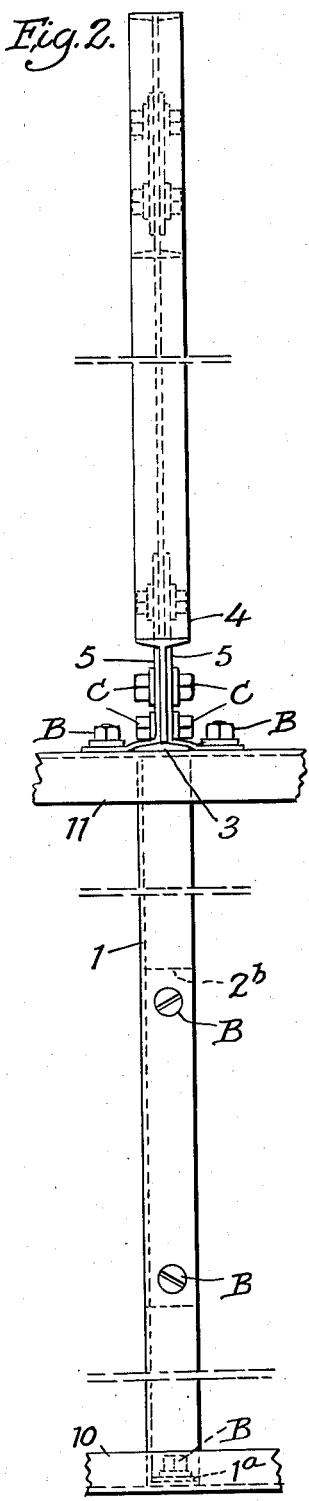
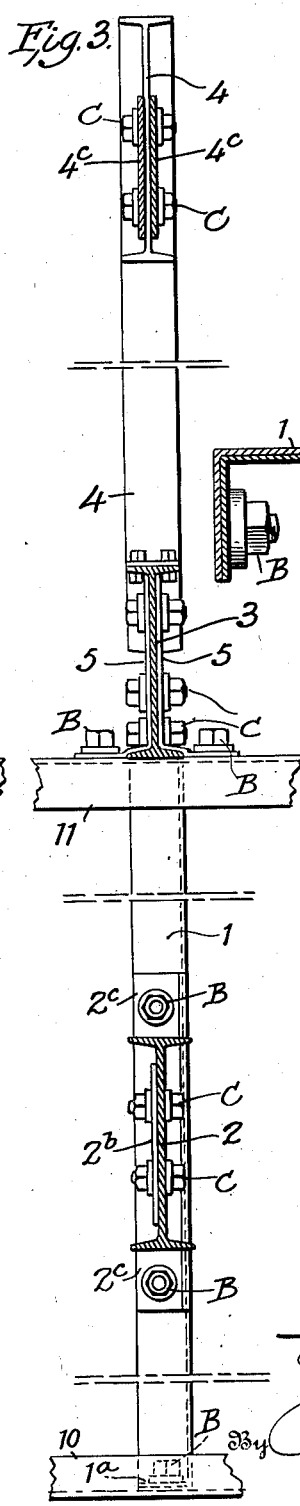
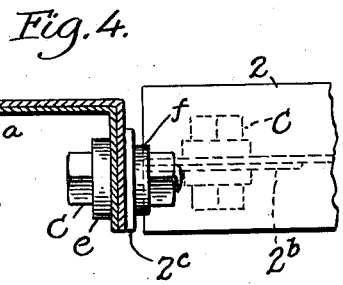
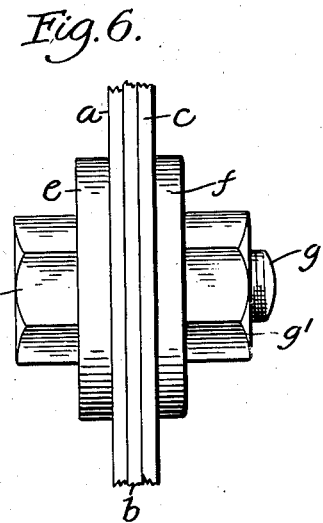

Patented Jan. 8, 1935

1,986,980

UNITED STATES PATENT OFFICE 1,986,980

METAL BUILDING CONSTRUCTION

David E. Ross, Lafayette, Ind., assignor to Rostone, Incorporated, Lafayette, Ind., a corporation of Indiana Application June 12, 1933, Serial No. 675,485

3 Claims. (Cl. 189—36)

This invention relates to metal building construction; and has particular reference to the method of and means for fastening metal shapes together. The invention is particularly designed for use in connecting structural metal shapes for buildings especially where such shapes are of comparatively light gauge material. The principal object of the invention is to provide connections whereby shearing or tearing of the thin metal surfaces under strain is prevented. Another object is to increase the bearing surfaces of thin metal shapes relative one to the other and also relative to the fastening bolts or rivets at the points of connection between the shapes, at which points they are subjected to the greatest tearing and shearing strains.

Where metal shapes or such as plates or webs of beams are united by bolts or rivets in the ordinary manner the extent of contact surface of the shape in contact with the bolt or rivet passing therethrough is very small, being only the thickness of the shape at the point of connection, and because of the low bearing value of such a connection the bolt or rivet opening in the shape is liable to become elongated or tear under the stress. To overcome this and to enhance the bearing surfaces at the point of fastening, I distort the metal of the shapes around the bolt or rivet-holes and draw out the metal around such holes in such manner as to form protruding frustums of hollow cones around such holes, at the points where the shapes are to be connected. The conical protuberances around the holes in the meeting surfaces of the shapes are so formed that they will fit one within the other and closely stack or nest axially one within the other. A bolt or rivet is then passed through these nested protuberances and secured to bind them firmly together axially. To enhance the binding effect I preferably employ opposed washers at opposite ends of the nest of protuberances, one washer preferably having a conical projection adapted to fit within the concave base of the nested cones and the other preferably having a concavity adapted to fit over the projecting end of the nest of cones, so that when the bolt or rivet is entered through these washers and the nest of cones and fastened it will bind the stack of cones axially together.

The aforesaid method of and means for connecting the shapes greatly increases the extent of surface contact of the shapes with each other and with the bolt or rivet at the connecting points and the fastening bolt or rivet is put under tension instead of shear. By means of such connections I obtain strong rigid lasting connections between structural shapes of thin cross section.

The accompanying drawings illustrate diagrammatically portions of the metallic framing of a building in which the major shapes are connected by my novel method and means, and I will explain the invention in detail with reference to the said drawings, and summarize in the claims the essential features of the invention and novel features of construction and combinations of parts for which protection is desired.

In said drawings:—

Fig. 1 is a view of a portion of the metal framing of a building, the members thereof being connected by my novel means. Fig. 2 is a side view of Fig. 1, looking from the left. Fig. 3 is a partly sectional view of Fig. 1, looking from the right. Fig. 4 is a detail sectional view on the line 4—4, Fig. 1. Fig. 5 is an enlarged detail sectional view through one of the novel connections, and Fig. 6 is an enlarged detail side view of one of the connections.

As shown in Figs. 1 to 3 the metal framing comprises a stud 1, floor beam 2, ceiling beam 3, and rafters 4. These are preferably formed of I-beams of relatively light gauge metal as compared with that ordinarily employed. The stud 1 may have its side flanges cut from the web near its lower end and the ends of the web and flanges bent as shown at 1a and resting on a foundation channel bar 10, and secured thereto by a bolt or rivet B in the usual manner.

A reinforcing member 2a, preferably formed of a short length of a U-bar, is fitted between the stud flanges at the point where the floor beam 2 is to be attached to the stud. The outer flanges of the member 2a and stud 1 may be connected by bolts or rivets B in the usual manner. At the inner side of stud 1 adjacent the member 2a is a bracket 2t, preferably formed of a short length of a T-bar having its flange 2b cut away so that the ends 2c of its base flange project beyond the part 2b. The inner flanges of the member 2a and stud 1 and the base flange 2c of bracket 2t are united as indicated at C by my novel method and connection hereinafter described. The bracket 2t is preferably also secured to the stud by similar connections C.

On the upper end of the stud is supported a channel member 11, which is fastened by a bolt or rivet B to the inturned web and flanges of the upper end of the stud, as shown at 1b. The end of the ceiling beam 3 rests upon the channel member 11, and on said member at opposite sides of the ceiling beam are L-shaped brackets 5, the lower ends of which are fastened to the channel by bolts or rivets B of the usual type.

The upstanding parts of brackets 5 are secured to the web of the ceiling beam 3 by my novel connections C as hereinafter described. The outer end of the ceiling beam is beveled, as indicated at 3a in Fig. 1, so that the web of the rafter beam 4 can extend thereover as indicated in Fig. 1, and pass between the brackets 5, and be secured thereto by my novel connections C, as hereinafter described.

The inner flange of the rafter beam 4 is sheared from the web thereof and turned at an angle thereto, as shown at 4a in Fig. 1, so as to overlie the upper flange of the ceiling beam 3 and these flanges are united at this point by bolts or fastenings B of ordinary construction.

The upper ends of the oppositely inclined rafters 4 are beveled and abut as shown in Fig. 1, and plate members 4c are placed on opposite sides of the webs of the rafters at this point and these plates are secured to each other and to the webs of the rafters by my novel connections C, hereinafter described.

The several connections C hereinabove referred to are of the type illustrated more clearly in Figs. 5 and 6. In these figures a, b, c represent the plate-like surfaces of the metal shapes, and for instance, may be the inner flange of the reinforcing member 2a, the inner flange of the stud 1a, and the base of the bracket 2; or the upstanding portions of brackets 5 and their intermediate web of beam 3 or rafter 4; or opposed plates 4c and intermediate webs of the rafter beams. At the points where the respective shapes are perforated for the passage of connecting bolts or rivets the metal is pressed to form a protuberance resembling a frustum of a cone surrounding the bolt opening as indicated at a', b', c' in Fig. 5. The fastening bolt or nut g extends axially through the nest of cones and is closely fitted therein and binds them together axially.

Preferably at the projecting end of this nest of cones is placed a washer e having a concavity e' which fits the convex end of the nest of conical protuberances (the protuberance a' of the adjacent plate a) and at the opposite end g of the nest of cones is a washer f having a conical projection f' which fits into the concave end of the nest of conical protuberances. The bolt or rivet g is entered through the washers and plates and secured by a nut g', thus clamping the conical protuberances and plates firmly between the washers.

In Figs. 5 and 6 I have shown three thicknesses of metal united, but obviously two, four or more thicknesses of metal could be connected by my method and means with the advantages hereinabove noted. The several connections indicated at C in Figs. 1 to 4 of the drawings are each of the character shown in Fig. 5; and those skilled in the art will readily understand the construction from the foregoing description and further detailed explanation of the several connections indicated at C in Figs. 1–4 is unnecessary.

It will be obvious from an inspection of Fig. 5 that this connection has great advantages over the ordinary method of bolting plates together. The conical protuberances greatly increase the extent of contact surface between the shapes and also of the shapes with the bolt; and the strength of the connection is greatly enhanced by the tension of the bolt; and by contact of the nested conical surfaces of the protuberances with the conical surfaces of the washers. By such connections the liability of thin metal plates to tear at the bolt openings or to shear the bolt, is greatly lessened; and the strength of the connection therebetween is greatly increased. While I have described bolts as used in the novel connections obviously rivets could be employed in place of the bolts.

I claim:—

1. Means for connecting metal shapes, comprising a plurality of metal shapes having lapping portions provided with preformed conical protuberances, the conical protuberances of the shapes fitting one within the other, a washer having a convex portion entered within the base of the nested protuberances, a second washer having a convex portion fitted over the apex of the nested protuberances, said protuberances and washers having axial openings; and a securing member extending through the axial openings in the nested washers and protuberances.

2. In combination, a plurality of metal shapes having lapping portions provided with preformed conical protuberances, the conical protuberances of the shapes fitting one within the other when the shapes are assembled, a washer having a convex portion entered within the base of the nested protuberances, a second washer having a convex portion adapted to receive the apex of the nested protuberances, said protuberances and washers having axial perforations; and a securing bolt extending through the perforations in the washers and nested protuberances.

3. In combination, a plurality of metal shapes having lapping portions provided with perforated preformed conical protuberances, the conical protuberances of the shapes fitting one within the other when the shapes are assembled, a washer having a convex portion entered within the base of the nested protuberances, a second washer having a convex portion to receive the apex of the nested protuberances, a square shouldered bolt extending axially through the washers and nested protuberances, and a nut on said bolt.

DAVID E. ROSS.